(12) United States Patent
Ziemkiewicz et al.

(10) Patent No.: US 11,681,199 B2
(45) Date of Patent: Jun. 20, 2023

(54) LIGHT RECEIVE SCANNER WITH LIQUID CRYSTAL BEAMSTEERER

(71) Applicant: Analog Devices, Inc., Norwood, MA (US)

(72) Inventors: Michael Ziemkiewicz, Lakewood, CO (US); Scott Robert Davis, Denver, CO (US); Michael Howard Anderson, Lyons, CO (US); Bennett Sodergren, Golden, CO (US); Radhika Marathe, Watertown, MA (US)

(73) Assignee: Analog Devices, Inc., Norwood, MA (US)

( * ) Notice: Subject to any disclaimer, the term of this patent is extended or adjusted under 35 U.S.C. 154(b) by 958 days.

(21) Appl. No.: 16/543,060

(22) Filed: Aug. 16, 2019

(65) Prior Publication Data

US 2021/0278741 A1    Sep. 9, 2021

(51) Int. Cl.

| | | |
|---|---|---|
| *G02F 1/313* | (2006.01) | |
| *G01S 17/08* | (2006.01) | |
| *G02B 6/00* | (2006.01) | |
| *G02F 1/13* | (2006.01) | |
| *G01S 7/481* | (2006.01) | |
| *F21V 8/00* | (2006.01) | |
| *G02F 1/01* | (2006.01) | |
| *G02F 2/00* | (2006.01) | |

(52) U.S. Cl.
CPC ............ *G02F 1/313* (2013.01); *G01S 7/4817* (2013.01); *G01S 17/08* (2013.01); *G02B 6/00* (2013.01); *G02B 6/0001* (2013.01); *G02F 1/011* (2013.01); *G02F 1/1326* (2013.01); *G02F 2/004* (2013.01); *G02F 2203/24* (2013.01)

(58) Field of Classification Search
None
See application file for complete search history.

(56) References Cited

U.S. PATENT DOCUMENTS 7,720,116 B2 * 5/2010 Anderson ............... H01S 5/143
                                                                  372/20
9,366,938 B1 * 6/2016 Anderson ............ G02F 1/2955
(Continued)

FOREIGN PATENT DOCUMENTS

WO    WO-2020161250 A1 * 8/2020 ............. G01S 17/89

*Primary Examiner* — Rhonda S Peace
(74) *Attorney, Agent, or Firm* — Schwegman Lundberg & Woessner, P.A.

(57) ABSTRACT

An optical system for receiving light scanned from different light origination locations in space can include a Liquid Crystal (LC) waveguide (LCW), including first and second LCW light ports. A beamsteering LC electrode can be included in or coupled to the LCW and can be configured to vary a receiving direction of light received at the second LCW light port in response to a varying electrical input signal applied to the LC electrode to scan receiving of light at the second LCW light port from different light origination locations in space. A photodetector can be optically coupled to the first LCW light port, such as to detect waveguided light from different light origination locations in space received in response to the varying electrical input signal applied to the first LC electrode. Ranger, bright-spot locking, laser detection, direct detect and coherent lidar, wavelength detection, and other techniques and use cases are possible.

24 Claims, 10 Drawing Sheets

(56) References Cited

U.S. PATENT DOCUMENTS

| | | | |
|---|---|---|---|
| 10,120,261 B2 | 11/2018 | Ziemkiewicz et al. | |
| 10,133,083 B1 | 11/2018 | Ziemkiewicz et al. | |
| 10,684,531 B1 | 6/2020 | Ziemkiewicz et al. | |
| 10,915,004 B2* | 2/2021 | Myers | G02F 1/295 |
| 10,976,579 B2* | 4/2021 | Ziemkiewicz | G02F 1/011 |
| 11,256,156 B2* | 2/2022 | Hashiya | G02B 6/122 |
| 2019/0204710 A1* | 7/2019 | Myers | G02F 1/292 |
| 2019/0265573 A1* | 8/2019 | Myers | G02F 1/295 |
| 2020/0050034 A1* | 2/2020 | Ziemkiewicz | G02F 1/1326 |
| 2021/0278741 A1* | 9/2021 | Ziemkiewicz | G02F 1/313 |

* cited by examiner

LIGHT RECEIVE SCANNER WITH LIQUID CRYSTAL BEAMSTEERER

STATEMENT REGARDING FEDERALLY SPONSORED RESEARCH OR DEVELOPMENT

This invention was made with government support under (1) N11-039-N6833516C0187, Naval Air Warfare Center-Aircraft Division, DoDAAC: N68335; (2) N11-039-N683351560068, Naval Air Warfare Center-Aircraft Division, DoDAAC: N68335; and (3) N11-039-N0002413C4063, Naval Sea Systems Command. The government has certain rights in the invention.

TECHNICAL FIELD

This document pertains generally, but not by way of limitation, to receiving light from scanned directions, and more particularly but not by way of limitation to a light receive scanner with a liquid crystal (LC) beamsteerer.

BACKGROUND

There is a great deal of interest in the photonics industry in devices that can steer a beam of light without moving parts. There are numerous applications for devices that rapidly steer beams of light for use in applications such as machine vision, optical communications, remote sensing, and more. Currently, most commercially available beamsteering technology is based on bouncing light from a laser off of a mirror that is mechanically steered in some way. Mechanically steered systems are susceptible to mechanical vibrations and shock, and many are large, heavy, and expensive.

This document concerns liquid crystal waveguide (LCW) beamsteerers, devices that can redirect laser beams, or other quasi-monochromatic light sources, without the need for moving parts and in a very small form factor. For example, a liquid crystal waveguide (LCW) can be used as a beamsteerer for guiding and steering light, such as can be received as an input light beam from a laser. A liquid crystal (LC) material can be used for steering light within or leaving the LCW, such as by applying a voltage to vary a property of the LC material in response to the voltage for steering the light.

SUMMARY

The present inventors have recognized, among other things, that in addition to being able to steer light within an LCW or light leaving an LCW (e.g., such as described in U.S. patent application Ser. No. 16/059,731, filed on Aug. 9, 2018, which is hereby incorporated herein by reference in its entirety), it can also be desirable to steer light entering an LCW—including light that is received from various light-origination locations in an environment of interest, rather than from a single fixed light-origination location. This can permit directionally scanning various light-origination locations within a region near the LCW, such as for emitted or reflected light from such light-origin locations. Further, this can permit directionally-scanned incoupling of the light, from directionally-scanned locations of interest in an environment of interest, into the LCW and then to a photodetector. The present techniques can be used in a light detection and ranging (lidar) system, such as can include either a direct detect or coherent lidar configuration and technique. A coherent lidar approach can mix the signal with a continuous wave local oscillator signal prior to detection. The resulting heterodyne signal includes signal amplitude and frequency information. A direct detect lidar approach can include using an interferometer or other optical frequency analyzer, and direct detection of the resulting signal intensity from the frequency analyzer to gain information regarding the frequency of the return lidar signal.

Accordingly, this document describes, among other things, an optical system for receiving light scanned from different light origination locations in space. The optical system can include a first Liquid Crystal (LC) waveguide (LCW), including first and second LCW light ports. The optical system can also include a beamsteering first LC electrode, such as can be included in or coupled to the first LCW. The first LC electrode can be configured to vary a receiving direction of light received at the second LCW light port, such as in response to a varying electrical input signal (e.g., received from control circuitry) applied to the first LC electrode. Such operation can scan receiving of light at the second LCW light input port from different light origination locations in space in an environment of interest. A photodetector can be optically coupled to the first LCW light port. The photodetector can be configured to detect waveguided light from different light origination locations in space, such as can be received at the photodetector in response to the varying electrical input signal applied to the first LC electrode.

Each of these non-limiting examples can stand on its own, or can be combined in various permutations or combinations with one or more of the other examples.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

This document describes, among other things, an optical system for receiving light scanned from different light origination locations in space. The optical system can include a first Liquid Crystal (LC) waveguide (LCW), including first and second LCW light ports. The optical system can also include a beamsteering first LC electrode, such as can be included in or coupled to the first LCW. The first LC electrode can be configured to vary a receiving direction of light received at the second LCW light port, such as in response to a varying electrical input signal (e.g., received from control circuitry) applied to the first LC electrode. Such operation can permit scanning receiving of light at the second LCW light input port from different light origination locations in space, rather than being limited to incoupling light from a single fixed light origination location. A photodetector can be optically coupled to the first LCW light port, such as to detect at the photodetector waveguided light from different light origination locations in space, such as can be received at the photodetector in response to the varying electrical input signal applied to the first LC electrode.

This document concerns liquid crystal waveguide (LCW) beamsteerers, which can include devices that redirect laser beams (or other quasi-monochromatic light sources), without requiring any moving parts and allowing a very small form factor. LCW beamsteerers can include devices that steer guided light that is trapped in a thin film planar waveguide, in which one or more layers of the waveguide can include electrically controllable liquid crystal (LC) material. Liquid crystal orientation can be controlled electrically, such as by using a shaped electrode pattern, such as to achieve steering of an output laser beam from the LCW in two dimensions.

Figure 1:
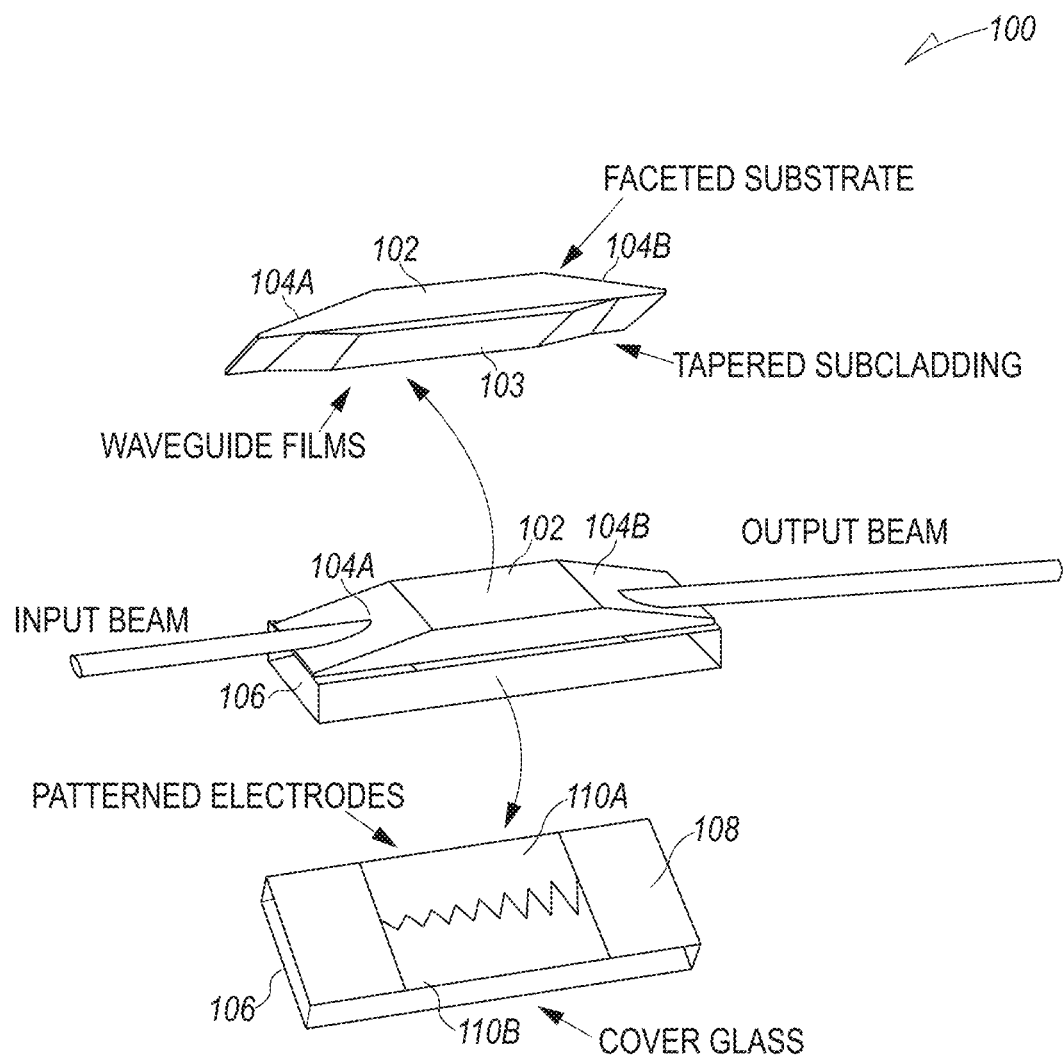
FIG. 1 is an exploded view that shows an example of an LCW.

FIG. 1 is an exploded view that shows an example of an LCW 100. The complete LCW is shown in the middle portion of FIG. 1, with the upper portion of FIG. 1 showing a bottom portion of the LCW 100, and the lower portion of FIG. 1 showing a top (cover) portion of the LCW 100. The LCW 100 can include a thin cell carrying LC material. A substrate 102 portion of the LCW 100 can be coated with one or multiple thin film layers, such as can make up part of a planar light waveguide. In some LCW examples, a portion of the substrate layers can include facets or can otherwise be tapered, such as to provide light ports 104. This can help allow light to enter and exit the LCW 100 at the corresponding facets or other light ports 104. In an LCW 100, this light coupling into or out of the LCW 100 can be accomplished using a diffraction grating, such as an alternative or in addition to one or both of the facets providing the light ports 104. In the example of FIG. 1, the substrate 102 can include light ports 104A-B, such as to can provide corresponding windows for light to enter and exit the LCW 100. These faceted light ports 104 can be augmented or replaced with corresponding gratings. The substrate 102 can also include a subcladding 103, such as can include thinned or tapered regions, e.g., corresponding to the regions of the light ports 104A-B, and a thicker subcladding region therebetween.

The other side of the LCW 100 cell can be referred to as the "cover" or "cover glass" 106, although it need not be made of glass. The cover glass 106 can include a surface 108, such as can be configured to face toward the substrate 102. The surface 108 can include a patterned electrically conductive material providing beamsteering electrodes 110 that can be electrically accessed by control circuitry. The control circuitry can apply an electrical signal to the beamsteering electrodes 110, such as to change the average orientation of the LC molecules in the parts of the LCW 100 cell that are adjacent to the electrodes 110. The physical pattern of the electrodes 110 shown in FIG. 1 can include or consist of several (e.g., three) regions, which can be used to steer a laser beam input into the LCW 100, such as in one or more of left, right, or out-of-plane directions, respectively. An additional electrode region can be included, such as can be used to help steer coupling of laser light into the LCW 100. The pattern of the electrodes 110 such as described has been simplified for clarity. More complex patterns of electrodes 110 can additionally or alternatively be used, such as for the various applications described herein. For example, such patterns of electrodes can include "kickers", "jaws", and in-plane focusing lenses, such as described in U.S. Pat. Nos. 10,120,261, 10,133,083, and U.S. patent application Ser. No. 16/283,229, each of which is hereby incorporated by reference herein in its entirety.

The operation of these LCW 100 cells can be entirely non-mechanical, without requiring any moving parts to steer the light. This is of great interest, such as for applications in which robust operation is desired. This mechanically-robust solid-state approach can be highly resistant to unwanted effects, such as from shock or vibration in the environment of the beamsteerer LCW 100. It is also expected to be able to have good long-term reliability and survivability and to result in a lower-cost beamsteering device.

For the examples explained below, the operation shown and described with respect to the LCW 100 in FIG. 1 has been reversed. For example, instead of using the LCW 100 to change the direction of light input into the LCW 100 by an input laser beam oriented at a fixed location with respect to the LCW 100, the LCW 100 can be reconfigured and used to selectively take in light arriving from a particular direction (which direction can be scanned or otherwise adjusted) and to send such directionally-intaken light to a photodetector. In an example, the reconfigured LCW 100 can be operated in a transceiver mode, such as in which it can be used to both steer light toward a specifiable direction and to also to collect light specifically reflected or otherwise originating from that same specifiable direction.

Figure 2:
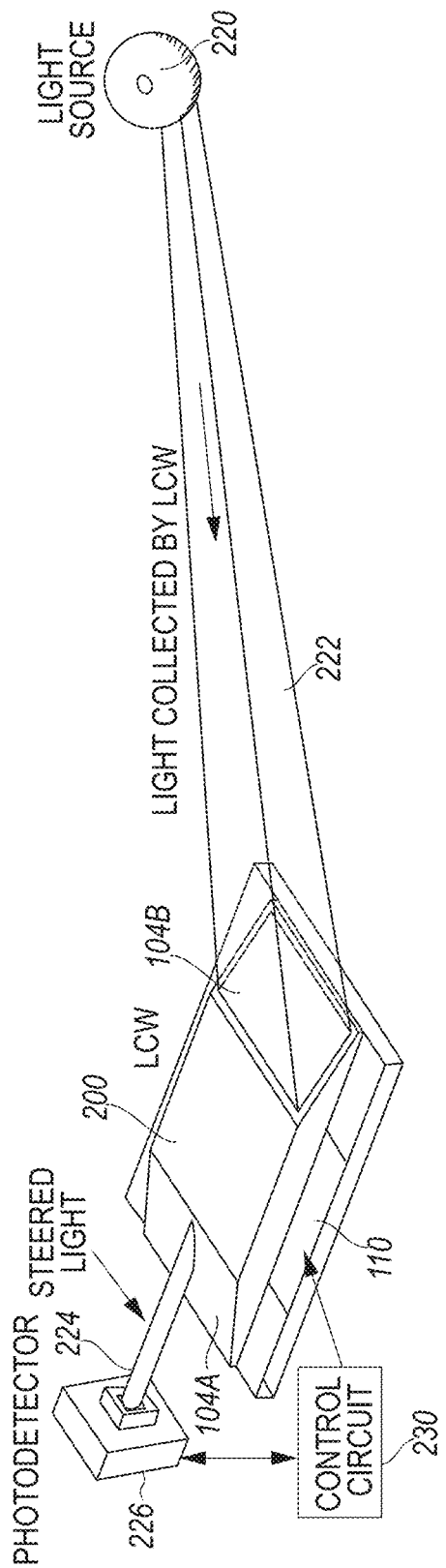
FIG. 2 shows an example of an approach for using an LCW in a variable-directional light receive mode.

FIG. 2 shows a schematic example of an approach for using an optical system that can include a LCW 200 that can be configured in a variable-directional light receive mode. In the example of FIG. 2, a remote light source location 220 can emit light 222 (such as via light reflection, light generation, or both). In FIG. 2, some of that emitted light 222 is shown as incident on the entrance aperture of the LCW, such as being incident upon the facet providing the light port 104B. This incident light is then in-coupled into the LCW 200. The in-coupled light can be waveguided within the LCW 200 and can be beamsteered in a reverse direction toward an opposite facet or other light port 104A. Such reverse direction beamsteering can be accomplished by a control circuit 230 providing an appropriate varying electrical control signal to one or more of the beamsteering control electrodes 110A, 110B. In this way, a control LC electrode can be configured to vary a receiving direction of light received at the light port 104B in response to a varying electrical input signal applied to one or more control LC electrodes 110 to scan receiving of light at the light port 104B from different light origination locations in space. The beamsteered waveguided light 224 can be funneled or otherwise directed via the light port 104A directly or indirectly back into a photodetector 226, which can be positioned at a specified location with respect to the LCW 200, or which can be integrated into the LCW 200. The photodetector 226 can be integrated with or otherwise optically coupled to the light port 104A, such as to detect waveguided light from different light origination locations in space received via the light port 104B and steered by the LCW 200 in response to the varying electrical input signal applied by the control circuit 230 one or more LC control electrodes 110. An output of the photodetector 226 can be coupled to signal processing circuitry, such as can be included in the control circuit 230. Such signal processing circuitry can include an optical threshold comparator circuit, such as when used in a laser-detection application. The optical threshold comparator circuit can be configured to compare an intensity of scanned received light at the LCW port 104B from different light origination locations in space, to one or more threshold values.

For a light source 220, located at a particular angular position with respect to the LCW 200 and with respect to the light port provided by the facet 104B, this reverse-direction beamsteering by the LCW 200 from the light port 104B to the light port 104A will only direct the in-coupled waveguided light from that particular angular position to the photodetector 226. This scannable unique directional light detection by the photodetector 226 corresponds to a certain set of control voltages applied to the control electrodes 110A, 110B of the LCW 200 to obtain the corresponding receive mode beamsteering. At other control voltages applied to the control electrodes 110A, 110B, this will not happen, and in such case the in-coupled waveguided light will instead hit the sides of the LCW 200 and will not be directed toward the photodetector 226. Using this approach of beamsteering receive mode incoupled light from a particularized and variable angular direction, a receive-mode LCW 200 can be used to scan a scene of a nearby environment or a desired region thereof to look for incident sources of originated or reflected light, for example, such as by varying the control voltages applied to the control electrodes 110A, 11B of the receive-mode LCW 200 to effect such scanning of various locations in the operating environment from which an incident source of light is to be detected.

Figure 3A:
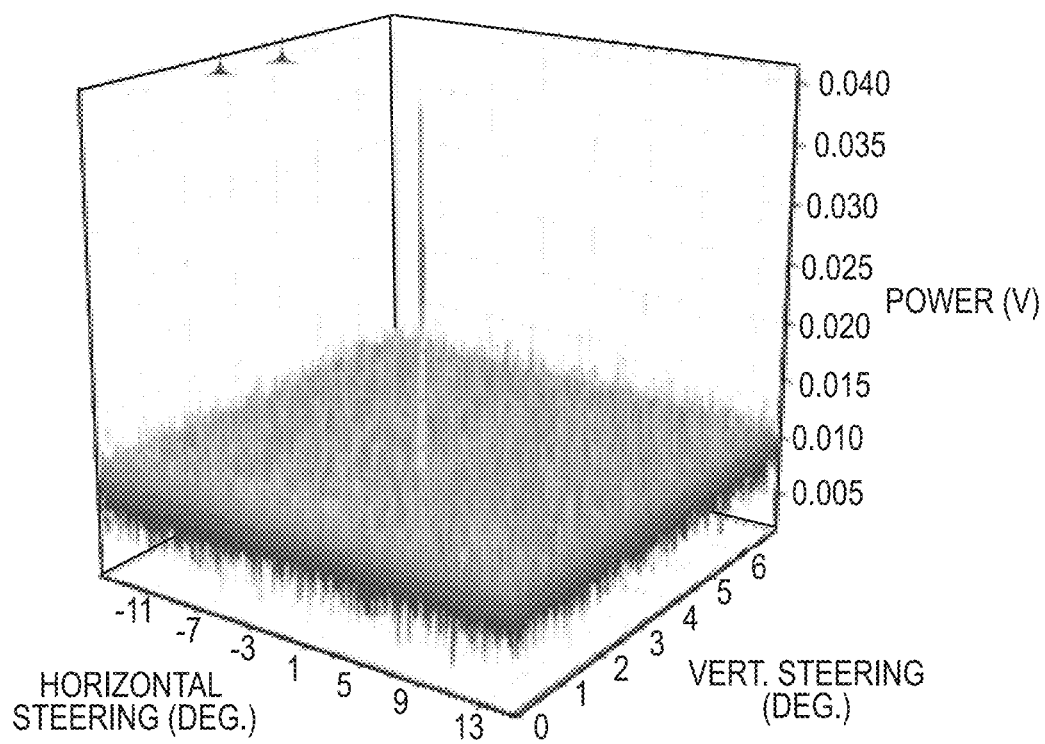
FIGS. 3A, 3B show an example of power vs. horizontal and vertical steering angle graphs of experimental results for a receive-mode LCW.
Figure 3B:
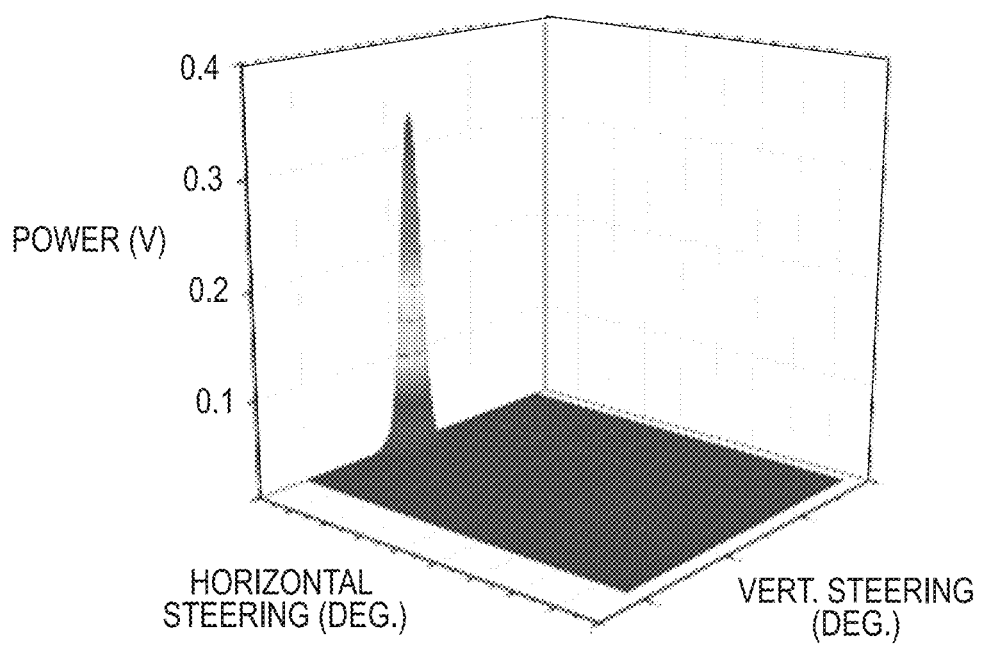

FIGS. 3A, 3B show an example of power vs. horizontal and vertical steering angle graphs of experimental results for a receive-mode LCW 200, when a laser beam light source 220 was incident on the entrance aperture or light port 104B, and control voltages applied to the control electrodes 110A, 110B, were scanned over the field of view (FOV) of the LCW 200 device. FIG. 3A shows results for a weak incident laser beam, and FIG. 3B shows results for a strong incident laser beam. In the example for which the experimental results are shown in FIGS. 3A, 3B, the photodetector 226 included a focusing lens, a fiber optic cable, and a photodiode, such that the photodetector 226 was quite good at rejecting light that is not directly pointed in the preferred direction, which corresponds to light from the environment incident in a particular angular direction with respect to the light port 104B, as scanned by varying the control voltages applied to the control electrodes 110A, 110B.

In these plots of FIGS. 3A, 3B, the x-axis (horizontal steering) and they-axis correspond to the direction in which the LCW 200 control voltages applied to the control electrodes 110A, 110B have been set to "stare". The z-axis shows the photodetector response power in (Volts). FIG. 3A shows an example of the photodetector response over the full FOV when the strength of the laser source is relatively weak compared to the photodetector's sensitivity limit. As seen in the experimental results of FIG. 3A, the receive-mode LCW 200 is quite good at pinpointing the direction of the incoming laser light in this case. FIG. 3B shows another case in which a laser is incident on the receive-mode LCW 200, but in the example of FIG. 3B, the laser intensity is strong compared to the photodetector's sensitivity limit. In FIG. 3B, again, the position of the detected laser is well-defined. Furthermore, this data set of FIGS. 3A-3B is quite free of any ghost images that could be caused by unwanted reflections in the LCW 200 device. Overall, the experimental results of FIGS. 3A-3B demonstrate that the receive scanner LCW 200 can be used very effectively for pinpointing the directional location of a remote laser system. For example, this can include coupling an electrical output of the photodetector 226 to scanning region optical threshold comparator circuitry, such as to compare to a threshold value an intensity of scanned and photodetected received light at the second LCW light port from different light origination locations in space.

There are a variety of potential applications for such a receive scanner LCW 200 device. For example, in autonomous vehicle driving, the receive scanner LCW 200 can be used to locate other autonomous vehicles, such as by collecting laser light from their own lidar systems associated with such other autonomous vehicles. In a military application, such a receive scanning LCW 200 could be used to quickly find the source of a hostile targeting laser. In a laser communication application, such a receive scanning LCW 200 could be used to determine the direction to a remote laser communications platform, such as based on detection and analysis of the light that it is sending out. After finding this direction, the local communications platform would be able to direct its own laser beam at the remote source, such as for initiating two-way laser communications.

While the experimental demonstration shown in FIGS. 3A, 3B of this "laser detector" use of the LCW 200 is quite convincing, there is a potential challenge to using the receive mode LCW 200 in this way. LCW devices can be polarization-sensitive, because there tends to be a significant difference in effective index for transverse magnetic (TM) vs. transverse electric (TE) modes of guided electromagnetic light. In transmit-mode operation of the LCW 100, this issue can be addressed by simply using a polarized laser at the LCW input applied at the light port 104A, and by orienting the laser polarization so that it is only one of either TM or TE. The LCW 100 can then be designed to operate at that particular selected polarization. In the receive mode LCW 200, the situation is different since the user does not have control over the polarization of light arriving from a variable location remote location light source 220.

There are several potential techniques for dealing with this issue. For example, if the incident laser beam were known to be linearly polarized, a quarter wave plate could be placed at the light port 104B entrance to the LCW 200 and oriented such that the ordinary and extraordinary axes point at 45 degrees relative to the direction normal to the waveguide stack. In such a case, incoming TE light will be converted to circularly polarized light, half of which will be received by the LCW 200 as TM light. Incoming TM light will also be converted to circularly polarized light so that half of the incoming TM light will similarly be lost as well. Therefore, this quarter wave plate technique would remove polarization sensitivity but at the cost of losing half of the incoming laser power. The problem can also be addressed by inserting an adjustable half wave plate at the light port 104B LCW entrance so that both TE and TM polarizations can be detected at different times. Such a half wave plate can be adjustable, for example, using a liquid crystal cell similar to the LC cells used in LC displays.

In FIG. 2, the light detector is shown as using a photodetector 226 that is external to the LCW 200. In such an arrangement, light 222 from the operating environment can be in-coupled into the LCW 200 at the light port 104B, steered within the LCW 200, and coupled back out of the LCW 200 at the light port 104A before being collected by the external photodetector 226.

Figure 4A:
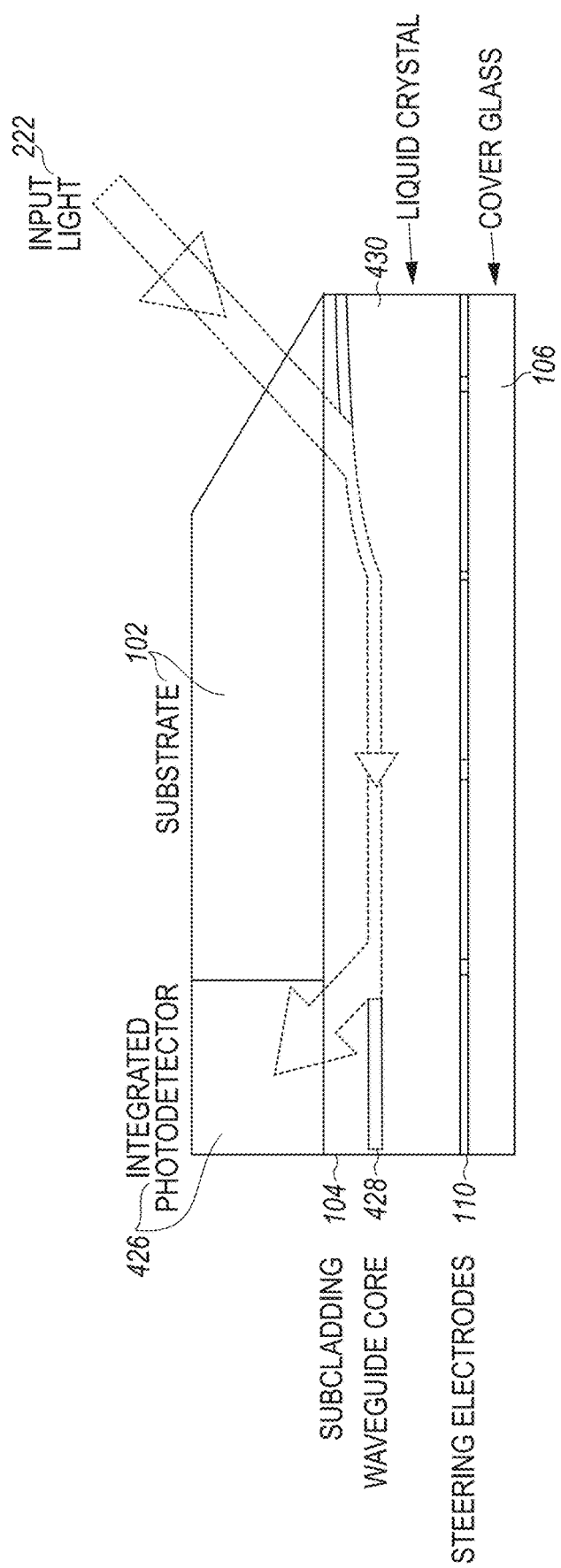
FIG. 4A shows an arrangement including an embedded or otherwise integrated photodetector, such as can be integrated into or near a shared substrate of the receive mode LCW.

FIG. 4A shows a cross-sectional view of an example of an arrangement including an embedded or otherwise integrated photodetector 426, such as can be integrated into or near a shared substrate 102 of the variable-input location receive mode LCW 200. For example, for a silicon substrate 102, the photodetector 426 can be made of doped silicon, germanium, or the like. Due to the higher refractive index of these materials, they can pull light out of the waveguide core 428 via the subcladding 104 and then absorb such light via photodetection generating electron-hole pairs in the photodetector 426 so it can be detected electrically by the photodetector 426. In such as case as shown in FIG. 4A, it is not necessary to add a second tapered subcladding region near the embedded photodetector 426 provided that the subcladding layer 104 is sufficiently thin near the embedded photodetector 426 to allow transfer of light out of the waveguide core 428, through the subcladding layer 104, and into the photodetector 426. Optionally, the subcladding 104 thickness can also be tapered near the embedded photodetector 426, such as to allow for more efficient transfer of light out of the waveguide core 428 and into the embedded or integrated photodetector 426 such as shown in FIG. 4A. FIG. 4A also shows an example of the steering electrodes 110 that can be used to control the LC material 430, such as for beamsteering by the LCW.

Figure 4B:
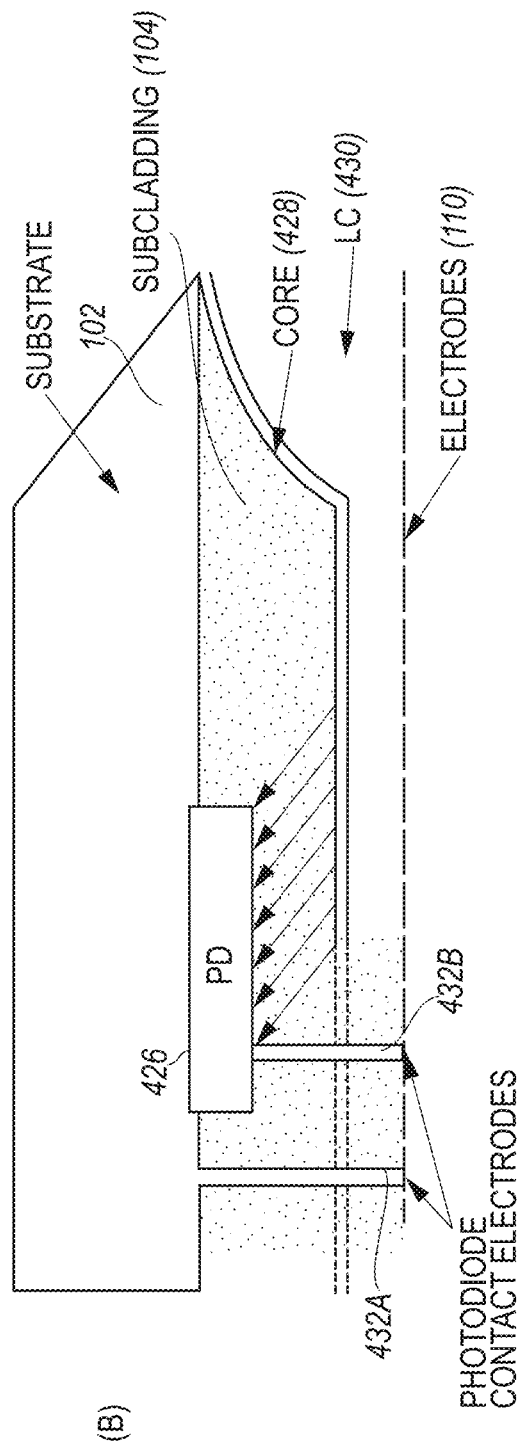
FIG. 4B shows a cross-sectional view of an example of another arrangement in which a photodetector can be integrated with the LCW and electrically contacted, such as from each of the substrate and subcladding sides of the photodetector.

FIG. 4B shows a cross-sectional view of an example of another arrangement in which a germanium or other photodetector 426 can be integrated with the LCW, such as between the substrate 102 and the subcladding 104. The photodetector 426 can be electrically contacted via one or more electrical contacts 432, such as can be located toward the same side of the LCW as the steering electrodes 110. For example, as shown in FIG. 4B, the photodetector 426 can be electrically accessed from the substrate side by a first contact 432A, which can form a via through the subcladding 104 to connect with the photodetector 426 indirectly via an electrical conductor within the substrate 102 with which the via of the first contact 432A is in electrical communication. Similarly, the photodetector 426 can be electrically accessed from the subcladding side by a second contact 432B, which can form a via through the subcladding 104 and can thereby directly connect to the subcladding side of the photodetector 426.

Figure 5:
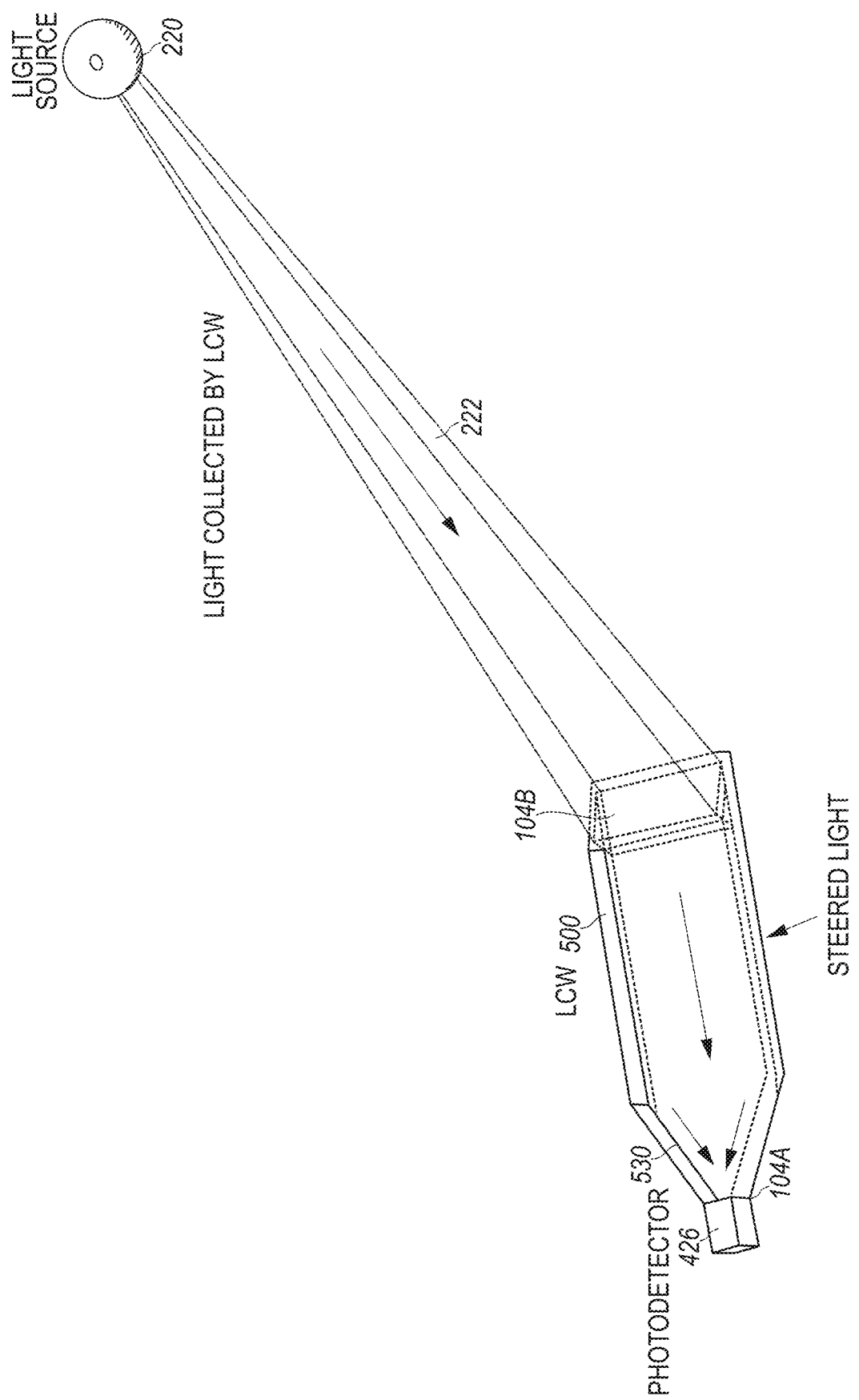
FIG. 5 shows a receive mode LCW that can include a waveguiding in-plane tapered section, such as can help improve the light sensitivity of the integrated photodetector.

FIG. 5 shows a receive mode LCW 500 that can include a waveguiding in-plane tapered section 530, such as can help improve the light sensitivity of the integrated photodetector 426. The in-plane tapered section 530 added to the LCW 500 can have a purpose of funneling or otherwise collecting or concentrating light received from the environment at a larger area light port 104B into a smaller area light port 104A area of the LCW 500. The concentrated light at the smaller area light port 104A can, in turn, be coupled to a similar smaller area face of an embedded or external photodetector 226, 426, either directly or through an intermediate optical coupling device. This can be advantageous because smaller area photodetectors 226, 426 are generally faster (due to lower capacitance), less noisy (due to lower dark currents), and lower cost (due to less materials) than larger area ones. The tapered region 530 can have straight sides (e.g., such as shown in FIG. 5), or its sides can be continuously or smoothly curved, or its sides can include curved or straight sided segments, such as can permit one or more discontinuities between adjacent curved or straight sided segments. Such a curved taper or a beam expander can be used to focus the received and waveguided signal onto a small photodetector area, such as over minimal waveguide length, thus saving die area. For example, such a segmented taper can be configured (e.g., using an optimization algorithm) to achieve a desired amount of beam compression with a minimal or an acceptable amount of power loss, such as by using one or more abrupt lens-like shapes, such as can help correct incompatible wavefronts between waveguides of different widths and can help allow good coupling of the fundamental mode of the received and steered light into the photodetector 226, 426. Such a segmented or smoothly curved tapered region 530 configuration can also be used in arrangement with an external photodetector 226, such as shown in FIG. 2. One or more other light concentrator devices or techniques can additionally or alternatively be used, with the in-plane tapered section 530 representing an illustrative example of a particular light concentrator device and technique.

Figure 6:
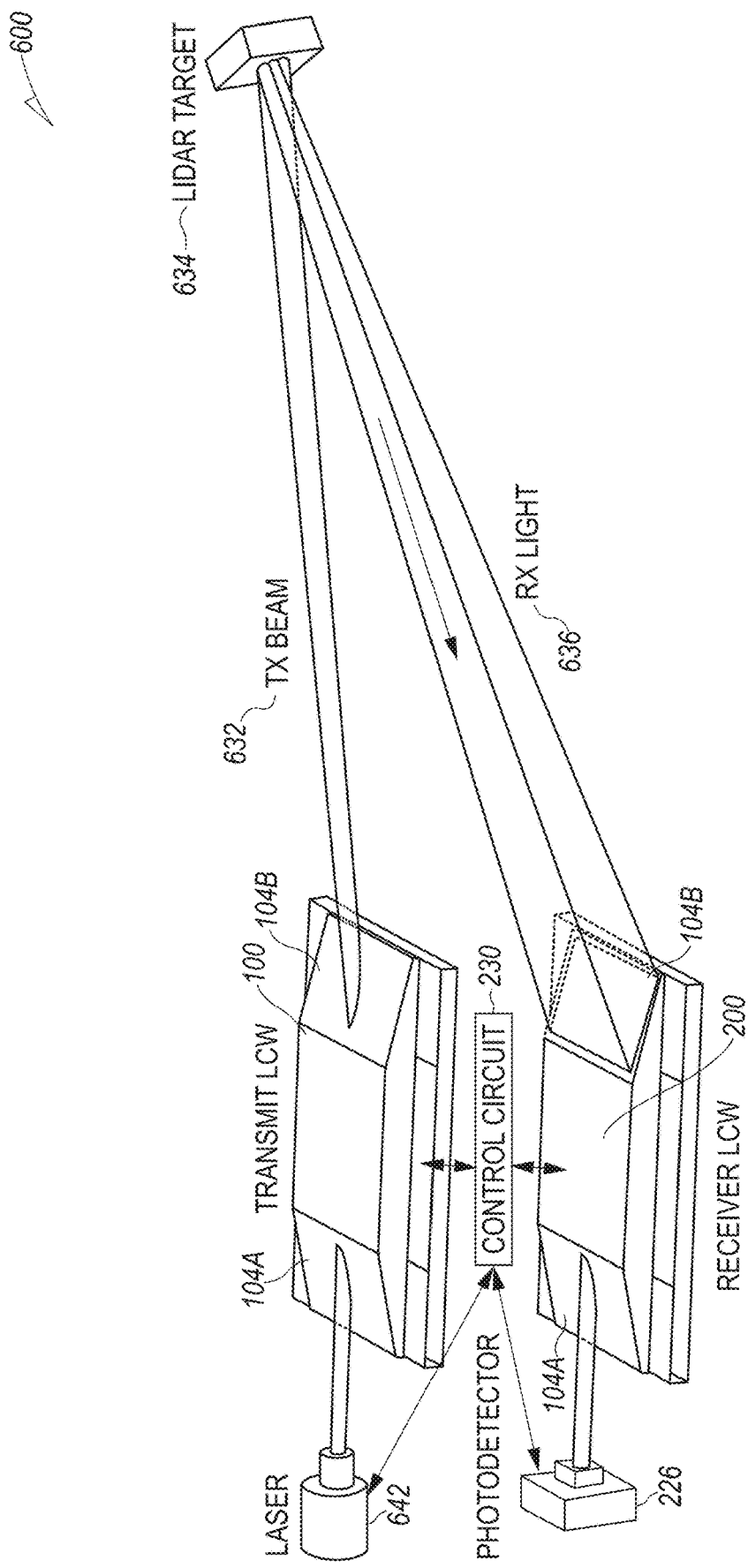
FIG. 6 shows an example in which the receive mode LCW can be used as a component of a light detection and ranging (lidar) system.

FIG. 6 shows an example in which the receive mode LCW 200, 500 can be used as a component of a light detection and ranging (lidar) system 600. In the example of FIG. 6, a transmitted lidar laser beam 632 can be input into a transmit mode LCW 100, such as via a light port 104A, and steered using the transmit mode LCW 100 or some other first transmit mode beamsteerer device. If the transmitted beam 632 exiting the light port 104B of the transmit mode LCW 100 hits a lidar target object 634 that is located within the range of the lidar system 600, then some reflected or scattered light 636 may impinge upon the entrance aperture light port 104B of another LCW 200, which is operated in receive mode. This light 636 is then in-coupled into the receive mode LCW 200 and waveguided to be directed onto a photodetector 226, 426, for light detection and subsequent analysis of the beam properties by the controller circuit 230, such as to determine the range and potentially the velocity of the lidar target 634.

By using the control circuit 230 for concurrently operating two LCWs, such as transmit mode LCW 100 operating in transmit (Tx) mode and receive mode LCW 200 operating in receive (Rx) mode, such as shown in FIG. 6, it is possible to use the control circuit 230 to coordinate scanning of both LCWs over the entire FOV. In this way, the receive mode LCW 200 can always be "looking" in the same direction as the place to which the transmit LCW 100 beam 632 is pointing. This can be helpful, such as for effectively avoiding interfering signals, such as may be emanating from other lidar systems on other vehicles that are also present in the operating environment.

In FIG. 6, the shown configuration can be referred to as "bistatic" because two separate steering stages are employed, e.g., transmit mode LCW 100 and receive mode LCW 200.

Figure 7:
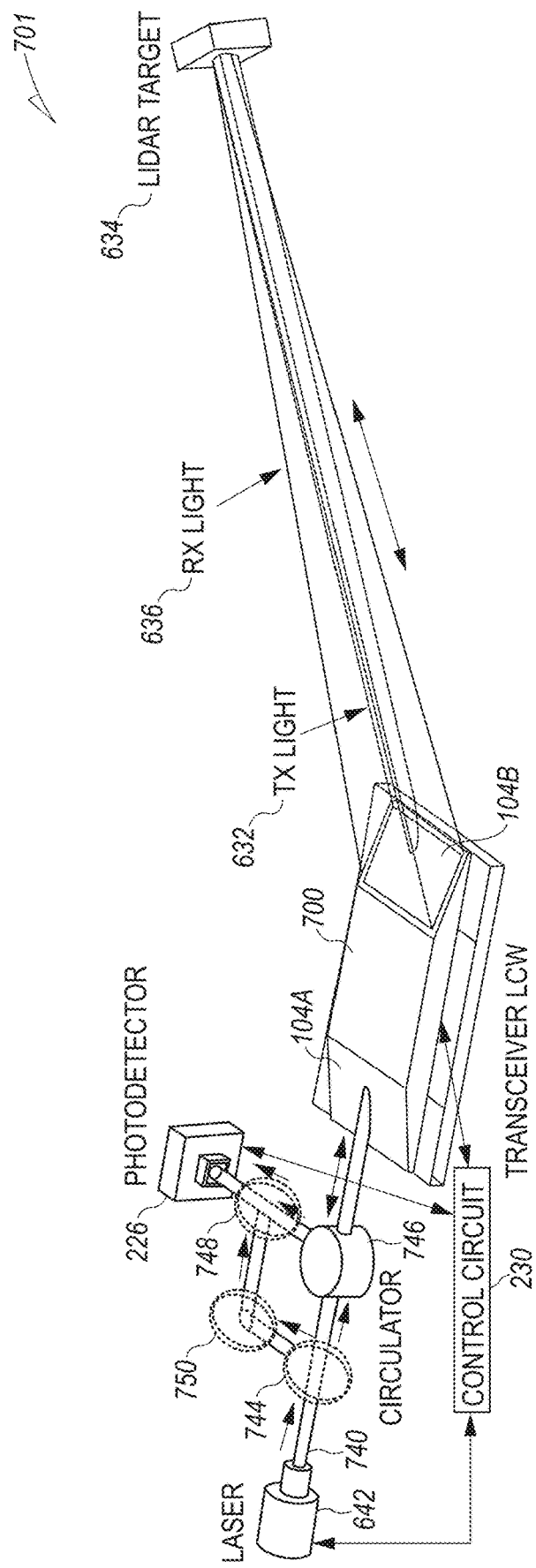
FIG. 7 shows an example in which an LCW can also be used in a "monostatic" or "transceiver" configured system.

FIG. 7 shows an example in which an LCW 700 can also be used in a "monostatic" or "transceiver" configured system 701. In this case, the LCW 700 can be used as a transceiver, that is, concurrently as a transmitter and as a receiver. The system 701 shown in FIG. 7 can be configured for a coherent lidar approach. In an example of the system 701, the incident laser beam 740 from an input laser 642 first encounters a beamsplitter 744 that sends some light through a circulator 746 and into a light port 104A of the transceiver LCW 700. The transceiver LCW 700 can operate in transmit mode, such as to steer the waveguided light from a light port 104B to direct a transmitted light beam 632 in a specific direction in space, such as may encounter a lidar target 634. From the lidar target 634, some scattered light 636 may return along the same path. Such scattered light 636 will be received at the light port 104B of the transceiver LCW 700, with such received light 636 then collected and steered by the LCW 700. Since the transceiver LCW 700 is also operating in receive mode, the collected light 636 is steered back so that it is precisely counterpropagating along the direction of the incident beam. This counterpropagating beam then enters the circulator 746, which sends some of it into a new direction, where it travels through another beamsplitter 748. At this second beamsplitter 748, the received light is combined with the light that was initially separated from the mainline beam 740 at the first beamsplitter 744. These two beams can then be combined to be incident on the photodetector 226, such as part of a heterodyne detection technique.

Note that one or more or all of the light paths shown as free space paths on the left side of FIG. 7 can optionally be replaced with one or more of a corresponding fiber optic path, a channel waveguide on a photonic integrated circuit (PIC), or the like. Also, one or more of the beamsplitters 744, 748, mirrors 750, and circulator 746 can optionally be replaced with other similarly functioning components. Moreover, the transceiver LCW 700 can be integrated with one or more other components in the system 701, such as to achieve transceiver beamsteering to both shine light on and receive light from a remote target 634. Optionally, a lens-shaped electrode can be integrated into the LCW electrode pattern 110A-B, such as to form a lens, such as for shaping the receive mode light wavefront in one dimension. This can help reduce or avoid unwanted artifacts in coherent detection, such as when the distance to the remote target 634 is approximately known or determinable.

FIGS. 6 and 7 show configurations in which a narrow transmit laser beam can be precisely shined by an LCW onto a remote target 634 and scattered or reflected return light can be captured using the steered receive mode LCW. This can be particularly useful for very long range lidar systems, such as in which the goal is to deliver maximal laser intensity on the remote target 634 such that as many photons are scattered as possible. However, for shorter-range lidar applications, for example, the receive mode LCW can be instead used in a "flash" configuration. In such a flash configuration, the environment can be illuminated with a temporally flashed wide-angle light source, so that all remote objects are hit by the flashed transmit (Tx) light and reflect or otherwise scatter light back to the lidar platform. Scattered light that is incident on the receive mode LCW can then be steered onto the photodetector, such as for detection, conversion into an electrical signal, and signal processing analysis such as to determine the range and velocity of the various remote target objects. For example, in such a flashed light source approach, a control circuit 230 can be configured to control the varying electrical input signal applied to an LC electrode 110A, 110B, such as to receive mode scan, thereby receiving of light at the first LCW light input port from different light origination locations in space. Optionally, the electrical input signal applied to the LC electrode 110A, 1101B can be applied by the control circuit 230 in synchronization with respect to one or more flashes of light from the flashed light source, such as to coordinate light transmitting and receiving.

By repeatedly flashing the environment using the wide-angle light source while concurrently scanning the received light detection angle with the receive mode LCW, a three-dimensional (3D) lidar image of the environment can be obtained. The receive mode LCW is well suited to this sort of flash lidar configuration because of its small form factor and its reliable solid-state design, which does not require expensive and unreliable moving mechanical parts. This type of flash lidar can be used for a variety of different angular distributions for the wide-angle flashed transmit (Tx) light. At one extreme, the output flash transmit light distribution can be an extremely wide-angle isotropic source for illuminating the entire remote scene. At another extreme, the flash transmit light distribution can include a more focused light source such as a laser beam that is slightly larger than the size of the received spot so that the receive mode LCW scanner serves to improve the scan resolution as compared to the size of the transmitted laser spot.

Also, the flashed transmit light can be configured to have an asymmetrical distribution, such as to be wide in one angular dimension and narrow in another. This can help increase local intensity for the same amount of total transmitted power. Such an asymmetric transmit beam shape can be made, for example, by including a cylindrical lens, such as can be located at the output light port 104B of the transmit LCW. Such a line-shaped illumination transmit beam can then be scanned in one dimension, such as with a transmit mode (Tx) scanner LCW 100, such as shown in FIG. 6, so that the transmitted light beam only impinges on objects along the line of the transmit beam cross section. The receive mode (Rx) scanner LCW 200 in FIG. 6 can then be scanned in the other dimension, such as to disambiguate targets along the illuminated line.

One advantage of the "half flash" configuration described in the previous paragraph is that each LCW (Tx LCW 100 and Rx LCW 200) need only be scanned in one dimension. Therefore, the two LCWs 100, 200 can each be individually configured, such as to optimize scanning in one dimension. For example, the transmit LCW 100 would not necessarily need either an outcoupling steering control electrode or an outcoupling taper, or an outcoupling facet. Transmit light can instead be allowed to directly exit from the waveguide layers at the end of the LCW 100, from which it would rapidly expand in the out-of-plane dimension, thus creating a line of transmit illumination light that is desired in the vertical direction. On the other hand, the receive mode LCW 200 may not require any in-plane steering electrodes at all. Instead, the receive mode LCW 200 can include or consist of the out-of-plane steering stage and an in-plane tapered light collector such as the tapered region 530 shown in FIG. 5. By not requiring an in-plane steering section in the receive mode LCW 200, it is possible to make a larger receive aperture as compared to that of the receive mode LCW 200 shown in FIG. 2.

The various flashed techniques described herein can be made to apply either to a direct detect lidar system or to a coherent lidar system, supported by the appropriate configuration of the control circuit 230 and any ancillary components for implementing such techniques. Also, for each lidar type (direct or coherent), the transmitted source of light need not be mounted on the lidar platform at all. Instead, it can originate from one or more external beacons. For example, in automotive lidar, such beacons can include beacon light sources mounted on the side of a highway or other roadway. Such external beacons can be flashed to illuminate nearby vehicles, which then scatter light that is received from the flashed beacons, and the scattered light can be received and analyzed by a local vehicle-mounted lidar system, such as can include a scanning receive mode LCW 200. The beacons can also simply serve to announce their own location by directly sending light to the receive mode LCW 200 device. A potential advantage of such an approach is that it allows vehicles to make use of lidar systems without the need for the complexity and expense of transmit lasers locally-mounted on the vehicle. Instead, a particular automotive lidar laser can effectively be shared by many lidar-employing vehicles on the same road.

Ranger Configuration and Techniques

FIGS. 6 and 7 show configurations that can be implemented as scanning lidar systems. For example, such configurations can be used to raster scan a laser beam over a remote FOV and collect a 3D image at some designated frame rate. However, unlike many mechanical lidar systems, such as may require spinning for scanning, LCWs are also capable of operating in a vector scanning mode, in which the LCW can point at a specific direction for an arbitrarily long time. This means that such an LCW lidar system can include a transmit mode LCW 100 that can be used to transmit and lock a laser beam onto a remote target 634. The LCW lidar system can also include a receive mode LCW 200 to ensure that the transmitted light indeed results in light being scattered back from the remote target 634. This received light signal can then be used as part of a feedback control loop, such as to help maintain optical contact with the remote target 634 and to measure its range or distance from the LCW lidar system platform, such as by analyzing the received and detected light using a time of flight (TOF) or coherent range-computation technique. Such a device can be referred to as a "ranger" in this document.

Locking onto a target using such a technique can also be used to help establish or maintain an optical communications link. Also, in a coherent lidar system, the angle control of the LCW 700 shown in FIG. 7 can be dithered, for example, such as to increase or maximize the returned signal, such as to help reduce noise such as can be due to coherent speckle effects. Such speckle effects are a major source of noise in a coherent lidar system. By slightly varying the incidence angle of the transmitted light on a remote target 634, the speckle pattern can be shifted, such that a region of constructive interference is incident on the entrance aperture light port 104B of the lidar receive mode LCW. This technique can be referred to as bright spot locking. Such bright spot locking can be particularly useful in a ranging application in which the receive LCW angle can be set to the same point for a similar period of time as that of the incident beam on the remote target 634. This can allow the opportunity for the receive mode LCW signal to be used in a feedback control loop, such as to find the bright spot and optimize receiving of the scattered signal.

This LCW ranger device can also include or be coupled with an inertial measurement unit (IMU), such as to further improve its ability to maintain contact with a remote target. In such a technique, the receive mode LCW 200 beam direction can be varied to scan and analyze the remote scene, while the IMU output information can be used to adjust the LCW control voltages, such as to cancel out or attenuate unwanted effects due to vibration or direction changes as may be present for an LCW ranger mounted on a moving vehicle.

Wavelength Analysis Configuration and Techniques

In FIG. 2, when light exits the waveguide light port 104A and travels toward the photodetector 226, its refracted angle out-of-plane with respect to the plane of the LCW 200 is a function of its wavelength. Therefore, the receive mode LCW 200 scanner can be used to analyze the wavelength of the received light as well as its direction. This can be accomplished by adjusting the voltage on the outcoupling electrode of the receive mode LCW 200 until light is incident on the photodetector 226. Such a technique can be particularly effective in ranging applications in which the receive mode LCW 200 spends a significant amount of time staring at a remote light source 220 or target 634 so that there is time to scan over the whole range of possible wavelengths.

Figure 8:
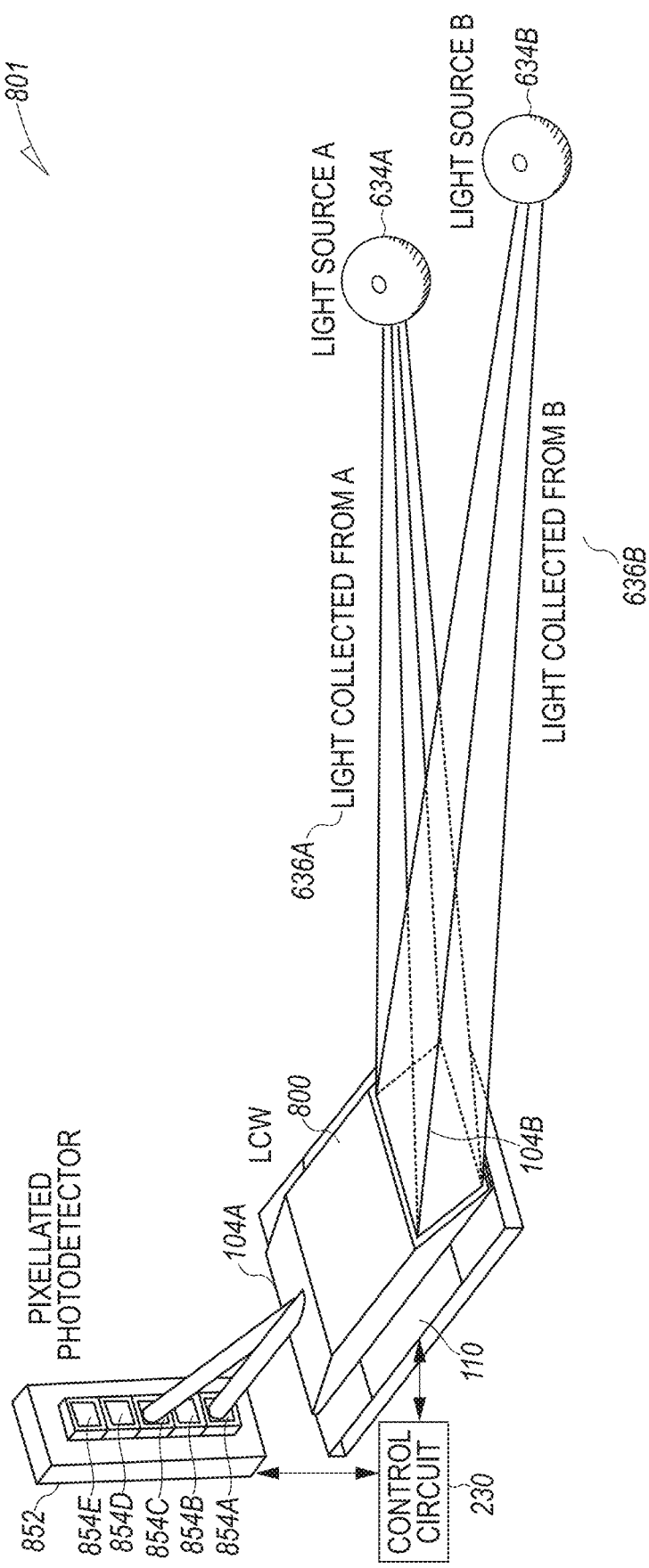
FIG. 8 shows an example of a system that can be particularly useful in a fast scanning application such as for wavelength analysis, such as to concurrently analyze a direction and wavelength of received light.

FIG. 8 shows an example of a system 801 that can be particularly useful in a fast scanning application for wavelength analysis, such as to concurrently analyze a direction and wavelength of received light. In FIG. 8, the photodetector 226 can be replaced by a pixelated photodetector 852, such as can include one-dimensional array of pixel photodetectors 854A-E. As shown in FIG. 8, this allows for concurrent measurement of direction and wavelength of received light, since each pixel photodetector 854A-E will respond to a separate wavelength band of received light that is refracted to be directed at that particular pixel photodetector 854. This is possible because, for a single-mode or a quasi-single-mode LCW 800, the output light direction depends only on the wavelength of the transmitted light, and not on the out-of-plane direction of incidence for the received light at the LCW entrance aperture at light port 104B.

The above description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

Figure 9:
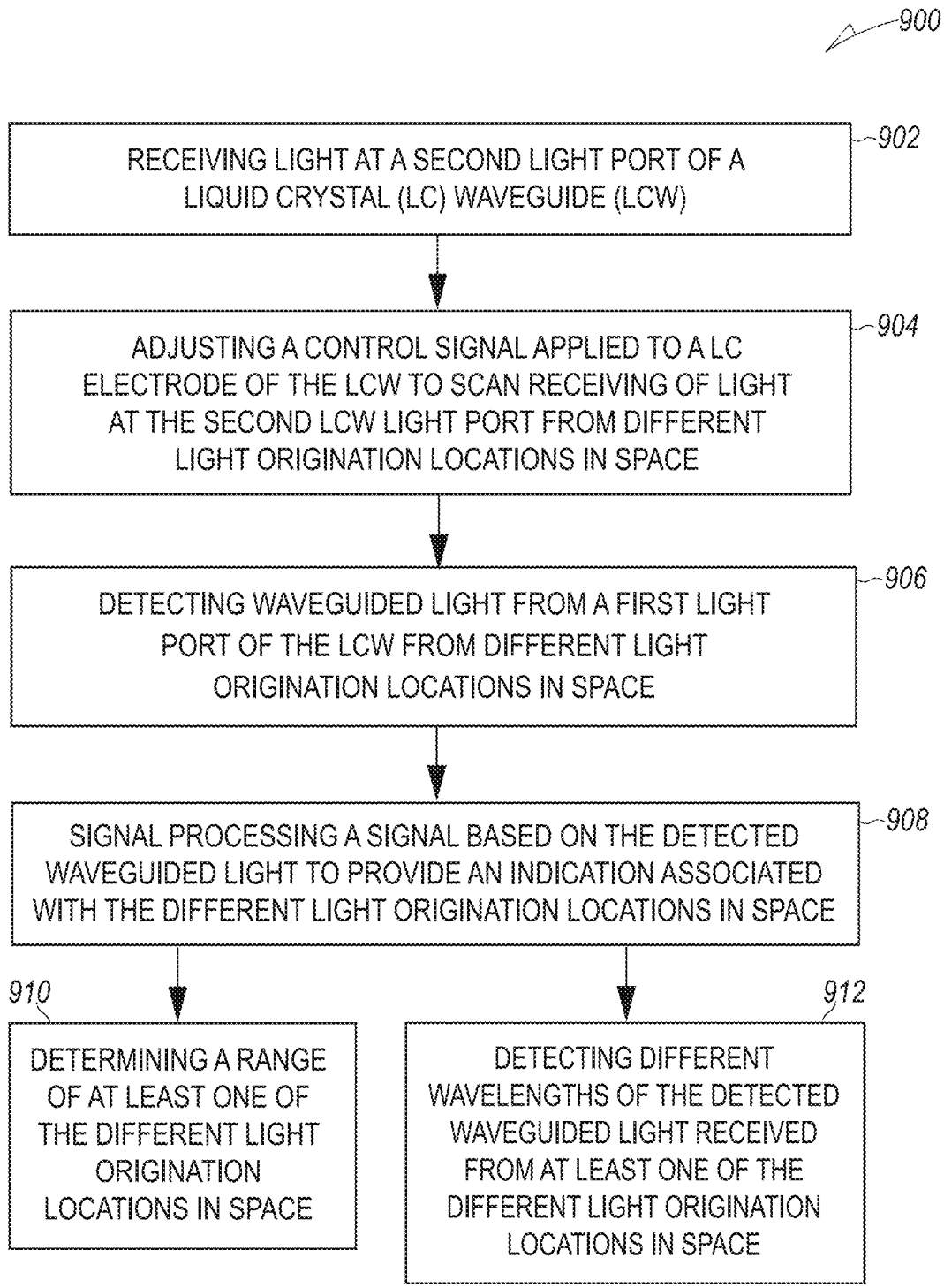
FIG. 9 is a flow chart illustrating generally an example of a method 900 of using an LCW for detecting waveguided light from different light origination locations in space.

FIG. 9 is a flow chart illustrating generally an example of a method 900 of using an LCW for detecting waveguided light from different light origination locations in space, such as explained above. At 902, light can be received at a second light port of an LCW, such as LCW 200, 500, 700, 800. At 904, a control signal applied to an LC electrode of the LCW can be adjusted, such as to scan receiving of light at the second light port of the LCW to receive light from (e.g., angularly) different light origination locations in space. At 906, beamsteered waveguided light from a first light port of the LCW can be detected, such as by a photodetector. At 908, a signal based on the detected beamsteered waveguided light from different light origination locations in space can be signal processed, such as to provide an indication associated with one or more of the different light origination locations in space. At 910, such signal processing can optionally include determining a range of one or more of the different light origination locations in space, which can correspond to a particular angle of the light origination location, as determined by the control signal applied to the LC control electrode of the LCW. At 912, such signal processing can optionally include detecting different wavelengths of the detected waveguided light received from at least one of the different light origination locations in space, such as by using a pixelated photodetector or other technique. FIG. 9 shows an example of illustrative uses of the scanning receive-mode LCW, but many use cases and applications are possible. For example, ranger or ranging, bright-spot locking, laser detection, direct detect and coherent lidar, wavelength detection, and other techniques and use cases are possible.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein". Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Geometric terms, such as "parallel", "perpendicular", "round", or "square", are not intended to require absolute mathematical precision, unless the context indicates otherwise. Instead, such geometric terms allow for variations due to manufacturing or equivalent functions. For example, if an element is described as "round" or "generally round," a component that is not precisely circular (e.g., one that is slightly oblong or is a many-sided polygon) is still encompassed by this description.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. An optical system for receiving light scanned from different remote light origination locations in space, the optical system including:
   a first Liquid Crystal (LC) waveguide (LCW), including first and second LCW light ports;
   a beamsteering first LC electrode, included in or coupled to the first LCW, the first LC electrode configured to vary a receiving direction of light received at the second LCW light port in response to a varying electrical input signal applied to the first LC electrode to scan receiving of light at the second LCW light port from different remote light origination locations in space and to direct received light from different remote light origin locations in space through the LCW from the second LCW light port to the first LCW light port;
   a photodetector, optically coupled to the first LCW light port, to detect waveguided light from different remote light origination locations in space at different locations of the photodetector by varying electrical input signal applied to the first LC electrode; and
   a control circuit, configured to control the varying electrical input signal applied to the first LC electrode to direct receiving of waveguided light at the first LCW light port from different remote light origination target locations in space and to control the photodetector to direct the waveguided light from different remote light origin locations in space to different locations of the photodetector.

2. The optical system of claim 1, in which the photodetector is integrated with the first LCW on a shared substrate.

3. The optical system of claim 2, comprising a scanning region optical threshold comparator to compare to a threshold value an intensity of scanned received light at the second LCW light port from different remote light origination locations in space.

4. The optical system of claim 1, in which an area of the second LCW light port is larger than an area of an input port of the photodetector, and wherein the first LCW waveguide tapers to concentrate light received at the first LCW light port and to direct the concentrated light to the input port of the photodetector.

5. The optical system of claim 1, further comprising:
   a second LCW, configured to receive input laser light at a third LCW light port and to guide and transmit the received input laser light out a fourth LCW light port; and
   a beamsteering second LC electrode, included in or coupled to the second LCW, the second LC electrode configured to vary a transmitting direction of light transmitted at the fourth LCW light port in response to a varying electrical input signal applied to the second LC electrode to scan transmitting of light at the fourth LCW light port toward different remote target locations in space.

6. The optical system of claim 5, wherein the received light at the second LCW port includes reflected light that is reflected from light transmitted from the fourth LCW light port.

7. The optical system of claim 1, further comprising:
a flashed light source; and
a control circuit, configured to control the varying electrical input signal applied to the first LC electrode to scan receiving of light at the first LCW light port from different remote light origination locations in space in synchronization with respect to one or more flashes of light from the flashed light source.

8. The optical system of claim 1, wherein the first LCW is configured to receive laser light input at the first LCW port, and further comprising:
a control circuit, configured to control the varying electrical input signal applied to the first LC electrode to scan transmitting of laser light received at the first LCW port and steered by the first LCW toward different remote target locations in space, and to receive at the second LCW port reflected light from the different remote target locations in space for being guided by the same first LCW toward the photodetector.

9. The optical system of claim 8, including a light circulator configured to direct toward the photodetector, via the first LCW port, waveguided light received from the different remote target locations in space.

10. The optical system of claim 1, in which the photodetector includes a pixelated photodetector including different pixels configured to receive and detect, via the first LCW port, different wavelengths of the waveguided light received from the different remote target locations in space.

11. The optical system of claim 1, included in or in combination with a LIDAR system.

12. The optical system of claim 11, in which the LIDAR system includes at least one of a direct detect LIDAR system or a coherent LIDAR system.

13. The optical system of claim 1, further comprising signal processing circuitry configured to use the waveguided light received from the different remote target locations in space to a determine a range of at least one of the different remote target locations in space.

14. The optical system of claim 1, further comprising control circuitry configured to control the varying electrical input signal applied to the first LC electrode to scan receiving of light at the first LCW light input port from different remote light origination locations in space for bright spot locking of at least one of the different remote target locations in space.

15. A method of receiving light scanned from different remote light origination locations in space, the method comprising:
receiving light at a second light port of a Liquid Crystal (LC) waveguide (LCW);
adjusting a control signal applied to a LC electrode of the LCW to scan receiving of light at the second LCW light port from different remote light origination locations in space; and
detecting waveguided light from a first light port of the LCW from the scanned different remote light origination locations in space, including controlling an electrical signal applied to a LC electrode near the first light port to steer waveguided light from scanned different remote light origin locations in space to different locations of a photodetector.

16. The method of claim 15, comprising signal processing a signal based on the detected waveguided light to provide an indication associated with the different remote light origination locations in space.

17. The method of claim 16, comprising using the indication for determining a range of at least one of the different remote light origination locations in space.

18. The method of claim 15, further comprising detecting different wavelengths of the detected waveguided light received from at least one of the different remote light origination locations in space.

19. An optical system for receiving light scanned from different remote light origination locations in space, the optical system including:
a first Liquid Crystal (LC) waveguide (LCW), including first and second LCW light ports;
means for scanning receiving of light at the second LCW light port from different remote light origination locations in space, including a control circuit configured to control a varying electrical input signal applied to an incoupling LC electrode to scan receiving of light to scan the different remote light origin locations in space; and
means for detecting, at different locations of a photodetector, waveguided light from a first light port of the LCW from different remote light origination locations in space.

20. The system of claim 19, comprising means for detecting different wavelengths of the detected waveguided light received from at least one of the different remote light origination locations in space.

21. An optical system for receiving light scanned from different light origination locations in space, the optical system including:
a first Liquid Crystal (LC) waveguide (LCW), including first and second LCW light ports;
a beamsteering first LC electrode, included in or coupled to the first LCW, the first LC electrode configured to vary a receiving direction of light received at the second LCW light port in response to a varying electrical input signal applied to the first LC electrode to scan receiving of light at the second LCW light port from different light origination locations in space; and
a photodetector, integrated with the first LCW on a shared substrate and optically coupled to the first LCW light port, to detect waveguided light from different light origination locations in space received in response to the varying electrical input signal applied to the first LC electrode.

22. An optical system for receiving light scanned from different light origination locations in space, the optical system including:
a first Liquid Crystal (LC) waveguide (LCW), including first and second LCW light ports;
a beamsteering first LC electrode, included in or coupled to the first LCW, the first LC electrode configured to vary a receiving direction of light received at the second LCW light port in response to a varying electrical input signal applied to the first LC electrode to scan receiving of light at the second LCW light port from different light origination locations in space; and
a photodetector, optically coupled to the first LCW light port, to detect waveguided light from different light origination locations in space received in response to the varying electrical input signal applied to the first LC electrode; and wherein an area of the second LCW light port is larger than an area of an input port of the photodetector, and wherein the first LCW waveguide tapers to concentrate light received at the first LCW light port and to direct the concentrated light to the input port of the photodetector.

23. An optical system for receiving light scanned from different light origination locations in space, the optical system including:

a first Liquid Crystal (LC) waveguide (LCW), including first and second LCW light ports;

a beamsteering first LC electrode, included in or coupled to the first LCW, the first LC electrode configured to vary a receiving direction of light received at the second LCW light port in response to a varying electrical input signal applied to the first LC electrode to scan receiving of light at the second LCW light port from different remote light origination locations in space; and a photodetector, optically coupled to the first LCW light port, to detect waveguided light from different remote light origination locations in space received in response to the varying electrical input signal applied to the first LC electrode;

a flashed light source; and a control circuit, configured to control the varying electrical input signal applied to the first LC electrode to scan receiving of light at the first LCW light port from different remote light origination locations in space in synchronization with respect to one or more flashes of light from the flashed light source.

24. The optical system of claim 23, including a light circulator configured to direct toward the photodetector, via the first LCW port, waveguided light received from the different remote locations in space.

* * * * *